United States Patent [19]
Ciaramita

[11] Patent Number: 5,591,261
[45] Date of Patent: Jan. 7, 1997

[54] ELECTROMECHANICAL CAKE DECORATING APPARATUS

[75] Inventor: Charles F. Ciaramita, Raleigh, N.C.

[73] Assignee: Too Sweet, Ltd., Atlanta, Ga.

[21] Appl. No.: 477,218

[22] Filed: Jun. 7, 1995

Related U.S. Application Data

[63] Continuation-in-part of Ser. No. 346,617, Nov. 30, 1994, Pat. No. 5,547,507.

[51] Int. Cl.$^6$ ............................................. A23G 7/00
[52] U.S. Cl. .................. 118/13; 118/500; 99/325
[58] Field of Search ............ 118/13, 500; 177/244, 177/245, 253; 99/325

[56] References Cited

U.S. PATENT DOCUMENTS

| | | | |
|---|---|---|---|
| 3,420,210 | 1/1969 | Lindquist | 118/18 |
| 3,993,150 | 11/1976 | Brosh et al. | 177/211 |
| 4,074,656 | 2/1978 | Haapala | 118/502 |
| 4,615,405 | 10/1986 | Morino et al. | 177/210 C |
| 4,650,970 | 3/1987 | Ohouchi | 219/506 |
| 4,672,181 | 6/1987 | Sakamoto et al. | 177/245 |
| 4,673,800 | 6/1987 | Hirai et al. | 177/245 |
| 4,683,967 | 8/1987 | Hanatani et al. | 177/245 |
| 4,723,615 | 2/1988 | Luchinger | 177/164 |
| 5,345,068 | 9/1994 | Hatano et al. | 219/722 |
| 5,360,965 | 11/1994 | Ishii et al. | 219/705 |

*Primary Examiner*—Laura Edwards
*Attorney, Agent, or Firm*—Deveau, Colton & Marquis

[57] ABSTRACT

An electromechanical cake decorating apparatus comprising a turntable and base for supporting a cake, a weight sensing circuit for determining the weight of the cake supported by the turntable and for outputting an analog voltage signal proportional to the weight of the cake, signal processor for receiving the analog voltage signal and for converting the analog voltage signal into display information which can be displayed on a digital display, and a digital display for receiving the display information and for displaying a digital number which corresponds to the weight of the cake supported on the turntable.

4 Claims, 9 Drawing Sheets

ELECTROMECHANICAL CAKE DECORATING APPARATUS

This is a continuation in part of Ser. No. 346,617, filed Nov. 30, 1994, now U.S. Pat. No. 5,547,507.

BACKGROUND OF THE INVENTION

1. Field of the Invention

The present invention relates to a method and apparatus for preparing and decorating cakes and, more particularly, to an electromechanical apparatus comprising a turntable and base for supporting the cake while the cake is being prepared, iced and decorated, weight circuitry for measuring the weight of the cake, digital processing circuitry for receiving weight information from the weight circuitry and for converting the information into weight information suitable for display, and display means for receiving information from the digital processing circuitry and for displaying a digital number which corresponds to the weight of the cake on the turn table.

Typically, grocery stores and bakeries sell certain types of cakes which, once prepared and decorated, should have a weight which is approximately equal to the weight specified for the particular type of cake. Whether or not a particular type of cake, once prepared and decorated, has the correct weight, depends on how accurately the person preparing the cake applies the icing and decorations. Currently, many grocery stores purchase cakes which are unprepared and undecorated when they arrive at the grocery store bakery/deli. The employee then prepares and decorates the cakes in accordance with specifications or directions supplied by the corporate office for each type of cake. One of the specifications is the type and amount of icing and other decorations to be provided on a particular type of cake. At present, employees generally have to approximate the amount of icing and decorations applied to the cakes. This is an extremely costly and inefficient method for gauging the amount of icing and decorations to be applied to cakes.

It is critical to accurately measure the amount of icing that is applied to a cake due to the fact that icing may represent, in many cases, as much as 40–50% of the product's total cost. The impact on commercial and retail profitability can be significant.

2. Prior Art

Haapala, U.S. Pat. No. 4,074,656, discloses a turntable for supporting a cake while it is being decorated wherein the axis of the turntable can be tipped so as to facilitate the application of decoration to the side of a cake. Haapala is primarily directed to providing a turntable which facilitates the cake decorator in decorating the sides of the cake. Haapala is not concerned with, nor are means provided for, ascertaining the amount of icing and decorations being applied to a cake.

C. R. Lindquist, U.S. Pat. No. 3,420,210, discloses a large turntable for supporting a cake while the cake is being decorated and smaller turntables for supporting icing to be formed into roses. The turntables are automatically driven at a slow speed by an electric motor. In operation, icing to be applied to a cake is placed by an employee or other person on the upper surface of the cake which is located on the larger turntable. A comb device having sawtooth edges positioned in the horizontal and vertical directions engages the icing on the side and top surfaces of the cake and spreads the icing as the cake rotates. Once the icing has been applied to the cake, a suitable utensil is used to smooth the icing on the top and the sides of the cake to remove the ridges formed by the sawtooth edges of the comb. Roses are formed on the smaller turntables by a skilled person as the smaller turntables rotate. As the icing roses harden, they are removed from the smaller turntables and placed on top of the cake. The apparatus does not comprise means for measuring or displaying the weight of the cake or the icing. Icing is merely deposited on the cake by the cake decorator and the comb having the sawtooth edges spreads the icing as the cake rotates. Similarly, icing to be formed into roses is placed on the smaller turntables by the cake decorator.

Both Haapala and C. R. Lindquist are directed at facilitating the cake decorating process. Neither of these patents disclose means for determining the weight of the cake or the weight of the icing applied thereto.

A cost analysis has been performed to determine how much money is lost per year due to too much icing and decorations being provided on cakes in retail in-store bakeries. It was determined that substantial losses were being incurred by each store. Therefore, a need exists in the industry for an apparatus which facilitates the application of icing and decorations to a cake while displaying the gross weight of the cake, thereby allowing the cake decorator to view the weight of the cake while it is being prepared so that the application of excess icing and decorations can be avoided. Similarly, the present invention also allows the cake decorator to avoid the application of a deficient amount of icing or decorations.

SUMMARY OF THE INVENTION

In accordance with the present invention, an electromechanical cake decorating apparatus is provided which comprises a turntable and a base for supporting a cake, a weight sensing circuit for determining the weight of the cake supported by the turntable and for outputting an analog voltage signal proportional to the weight of the cake, signal processing means for receiving the analog voltage signal and for converting the analog voltage signal into display information which can be displayed on a digital display, and a digital display for receiving the display information and for displaying a digital number which corresponds to the weight of the cake supported on the turntable.

If desired, a microprocessor or microcontroller can be interfaced with the processing circuitry to allow the weight information to be accessed and further processed for various purposes. A keypad, memory device, and display may be connected to the microprocessor to allow supervisory or management personnel to access and view the information provided to the microprocessor. For example, before decorating a cake, the cake decorator may enter his or her personal ID number and a number which corresponds to the type of cake to be decorated. Once the cake is decorated, the employee depresses another key on the keypad and the actual weight of the cake and the time are outputted to the microprocessor. A manager or supervisor would be able to access the employee personal identification number, the time a cake was decorated, and the final weight of the cake after it has been decorated by entering an appropriate request on the keypad. Such information may be useful in gauging employee performance and in determining how much excess icing has been used over a given period of time. Any software needed can be designed in accordance with the types of tasks to be accomplished. Furthermore, the microprocessor can be interfaced with the central inventory computer of the grocery store in order to allow the weight information to be accessed by the central computer.

Accordingly, it is an object of the present invention to provide an electromechanical cake decorating apparatus which allows the weight of the cake to be displayed while the cake is being decorated so that the cake decorator can ascertain when the correct amount of icing or decorations have been applied to the cake.

It is another object of the present invention to provide an electromechanical cake decorating apparatus which reduces costs associated with the preparation and decoration of cakes.

It is yet another object of the present invention to provide an electromechanical cake decorating apparatus which is capable of enhancing the efficiency of cake decorators.

It is yet another object of the present invention to provide an electromechanical cake decorating apparatus which provides means for processing, storing and accessing information relating to the amount of icing applied to cakes.

It is yet another object of the present invention to provide an electromechanical cake decorating apparatus which an be interfaced with a central inventory computer system.

These and other objects of the present invention will become apparent from the following discussion and claims.

BRIEF DESCRIPTION OF THE INVENTION

DETAILED DESCRIPTION OF THE INVENTION

Figure 1:
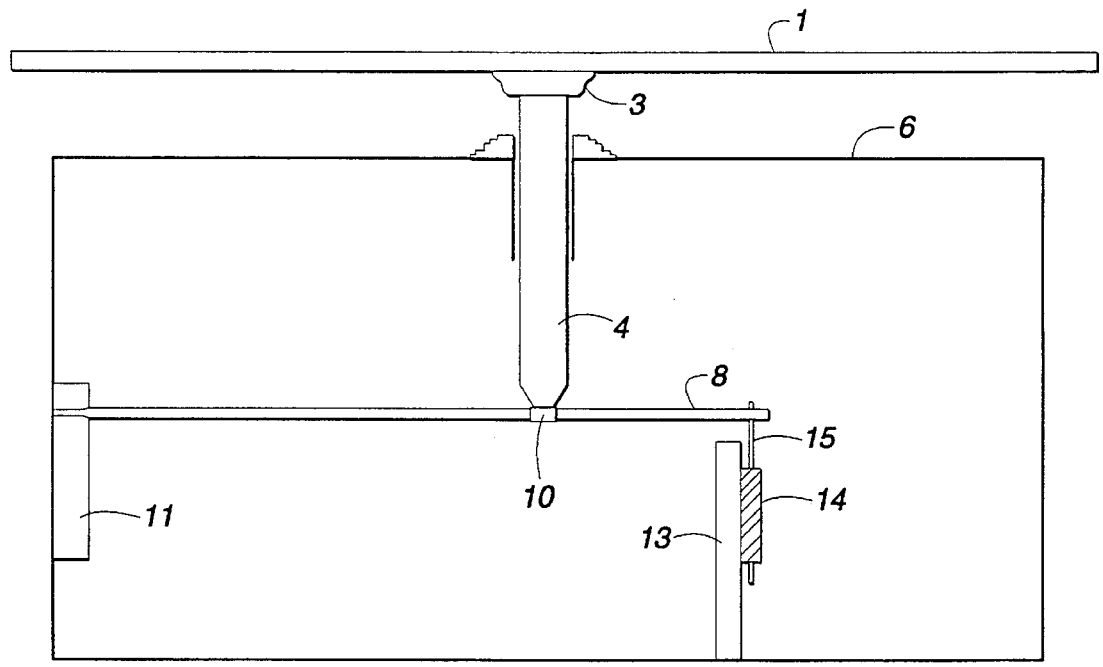
FIG. 1 illustrates a first embodiment of the turntable and base of the electromechanical cake decorating apparatus of the present invention.

FIG. 1 illustrates the turntable and base of the electromechanical cake decorating apparatus of the present invention in accordance with a first embodiment. The turntable is comprised of a platen 1, a flange 3, and a shaft 4. The base 6 of the turntable preferably contains the weight sensing circuit, the signal processing circuit and the display. However, in FIG. 1, only the transducer 14 is shown for ease of illustration. The transducer used preferably is an LCP8–10 rectilinear potentiometer manufactured by ETI Systems of Oceanside, Calif. However, it will be apparent to those skilled in the art that many other types of transducers are also suitable for use with the present invention. For example, laminated strain gauges can also be used, as discussed below with respect to FIGS. 9–12. Other types of rectilinear potentiometers which are suitable for use with present inventions are: Carter Manufacturing Model Number 632; Duncan Electronics, Inc. Model Number 601 and 9605; Maurey Instrument Corp. Model Number P1991-1; Midori Mac Model Numbers LP-U1,LP-3U and LP-20FP.

The shaft 4 of the turntable is coupled with a cantilevered beam 8 by a thrust bearing 10. The cantilevered beam 8 is attached to the base 6 by a support means 11. The rectilinear potentiometer is fixedly positioned within the base on a support means 13. The rectilinear potentiometer 14 is in contact with one end of the cantilevered beam 8. When a force is applied to the platen 1 of the turntable, the cantilevered beam 8 causes the vertical arm 15 of rectilinear potentiometer 14 to be depressed or retracted, thereby producing an analog voltage signal proportional to the force at the output of the rectilinear potentiometer 14.

Figure 2:
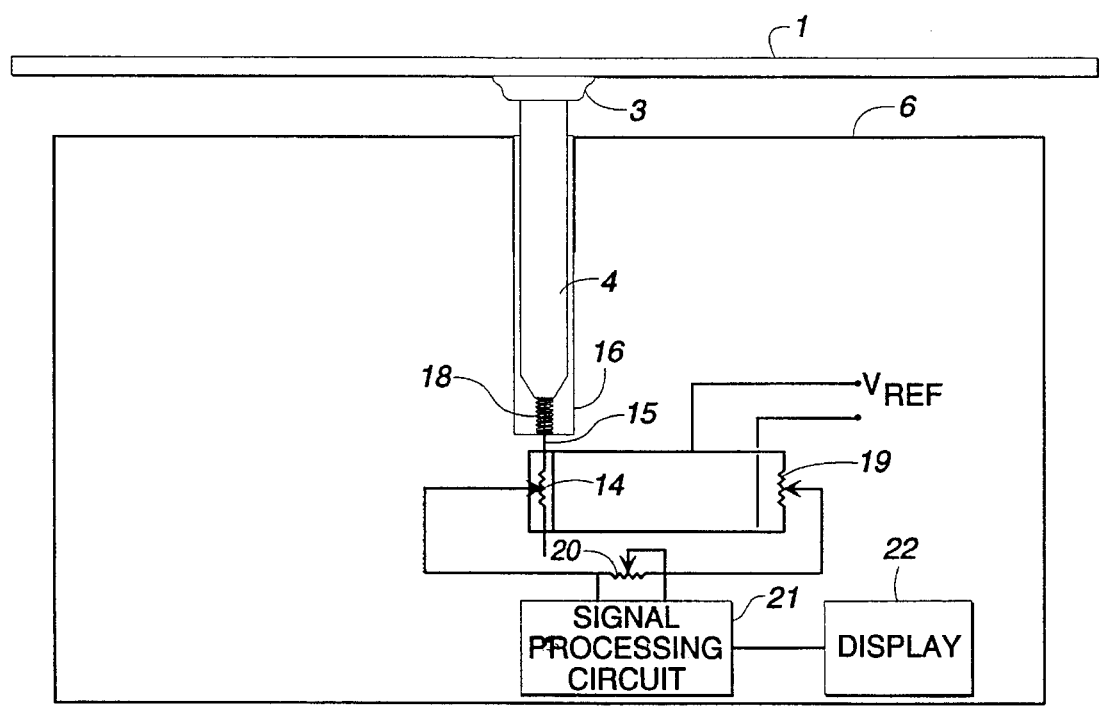
FIG. 2 illustrates a second embodiment of the turntable and base of the electromechanical cake decorating apparatus of the present invention.

FIG. 2 illustrates a second embodiment for the turntable and base of the present invention. The platen 1, flange 3 and shaft 4 of the turntable are identical to that shown in FIG. 1. However, in this embodiment, the rectilinear potentiometer 14 is located directly beneath the shaft 4 of the turntable. A recess 16 formed in the base 6 is preferably coated with Teflon® to allow smooth rotating action of the shaft 4 within the recess 16. The recess 16 is preloaded with a spring 18. The vertical arm 15 of the rectilinear potentiometer 14 passes through an opening formed in the bottom of recess 16, through the middle of spring 18 and is in contact with shaft 4. The rectilinear potentiometer 14 is supported within the base by support means (which is not shown in FIG. 2 for ease of illustration). Support means 13 shown in FIG. 1 is suitable for supporting the potentiometer 14 of FIG. 2. The weight sensing circuit comprises rectilinear potentiometer 14, zero adjustment potentiometer 19, and sensitivity potentiometer 20. The weight sensing circuit is identical to that shown in FIG. 4, below, and is configured to form a balanced bridge. The output from the potentiometer 14 is coupled to the signal processing circuit 21 which can take on any of the forms described below with respect to FIGS. 3, 5, 6 or 7.

When a force is applied to platen 1, shaft 4 compresses spring 18 and contacts the vertical arm 15 of potentiometer 14 causing it to retract, thereby producing an analog voltage signal proportional to the force applied to platen 1. The arrangement of the potentiometers 14, 19 and 20 in a balanced bridge permits adjustments to be made to the potentiometers so that the digital weight displayed corresponds to the force exerted on platen 1, as discussed below. The signal processing circuit 21 outputs 7-segment format information to display 22 which digitally displays the weight of the cake supported on the platen 1 of the turntable. The base can also contain the microprocessor 70, memory device 71, display means 73, and keypad 72 shown in FIGS. 8a–8c, if so desired.

Figure 8A:
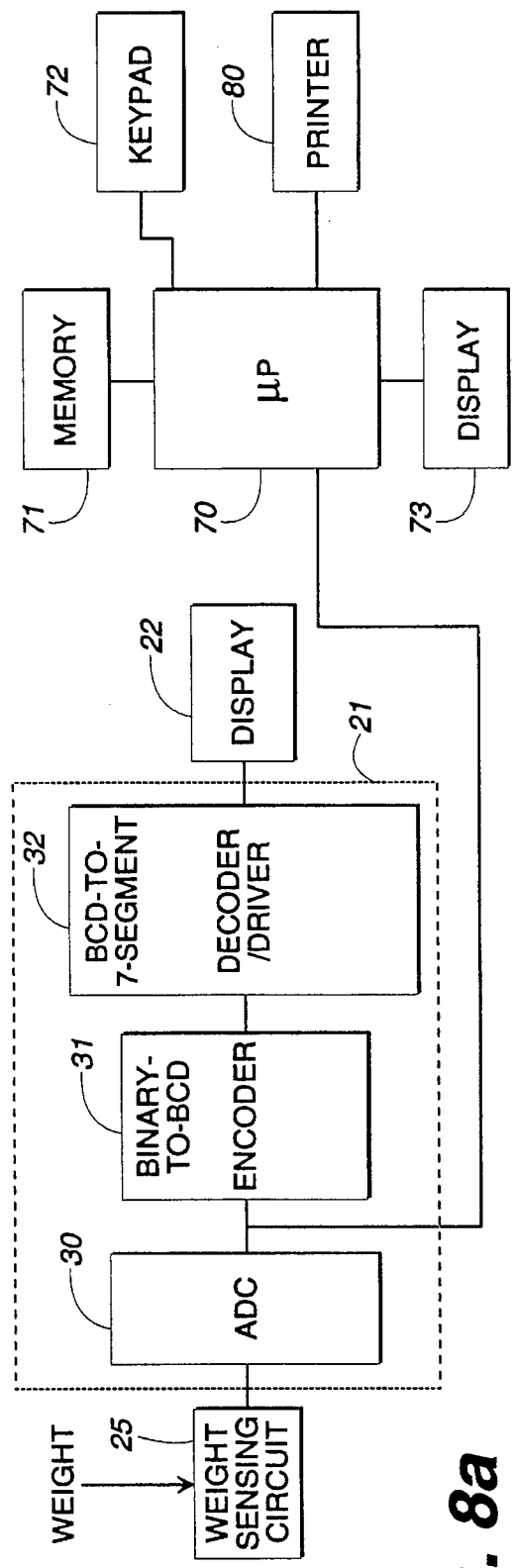
FIG. 8a illustrates a functional block diagram of an alternative embodiment of the circuit components of the electromechanical cake decorating apparatus of the present invention.
Figure 8B:
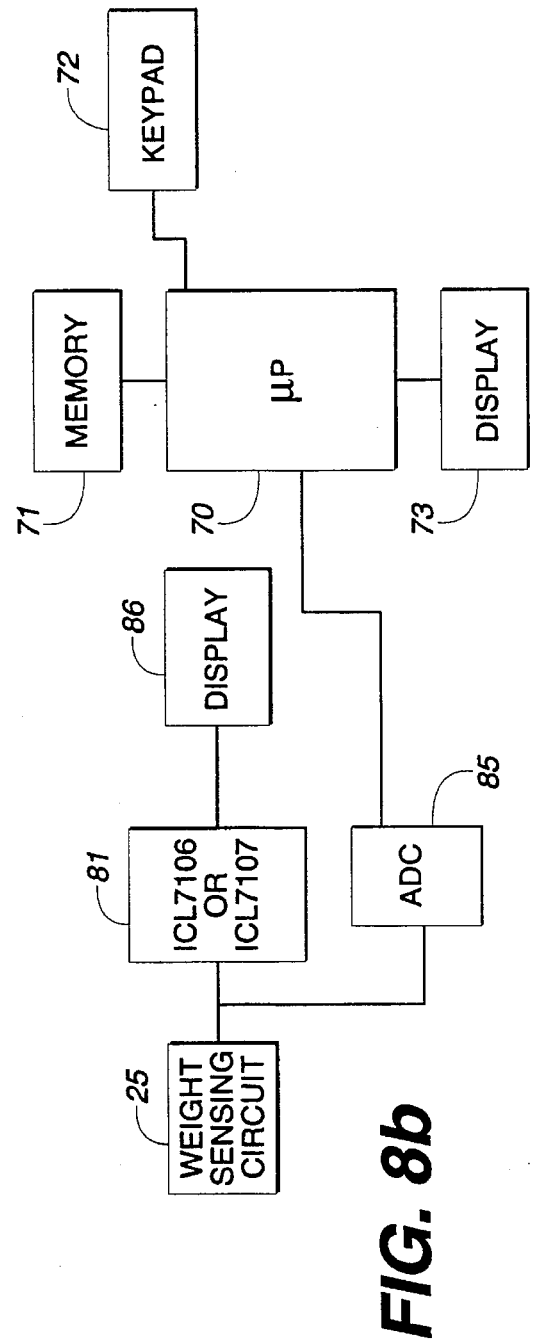
FIG. 8b illustrates a functional block diagram of an alternative embodiment of the circuit components of the electromechanical cake decorating apparatus of the present invention.
Figure 8C:
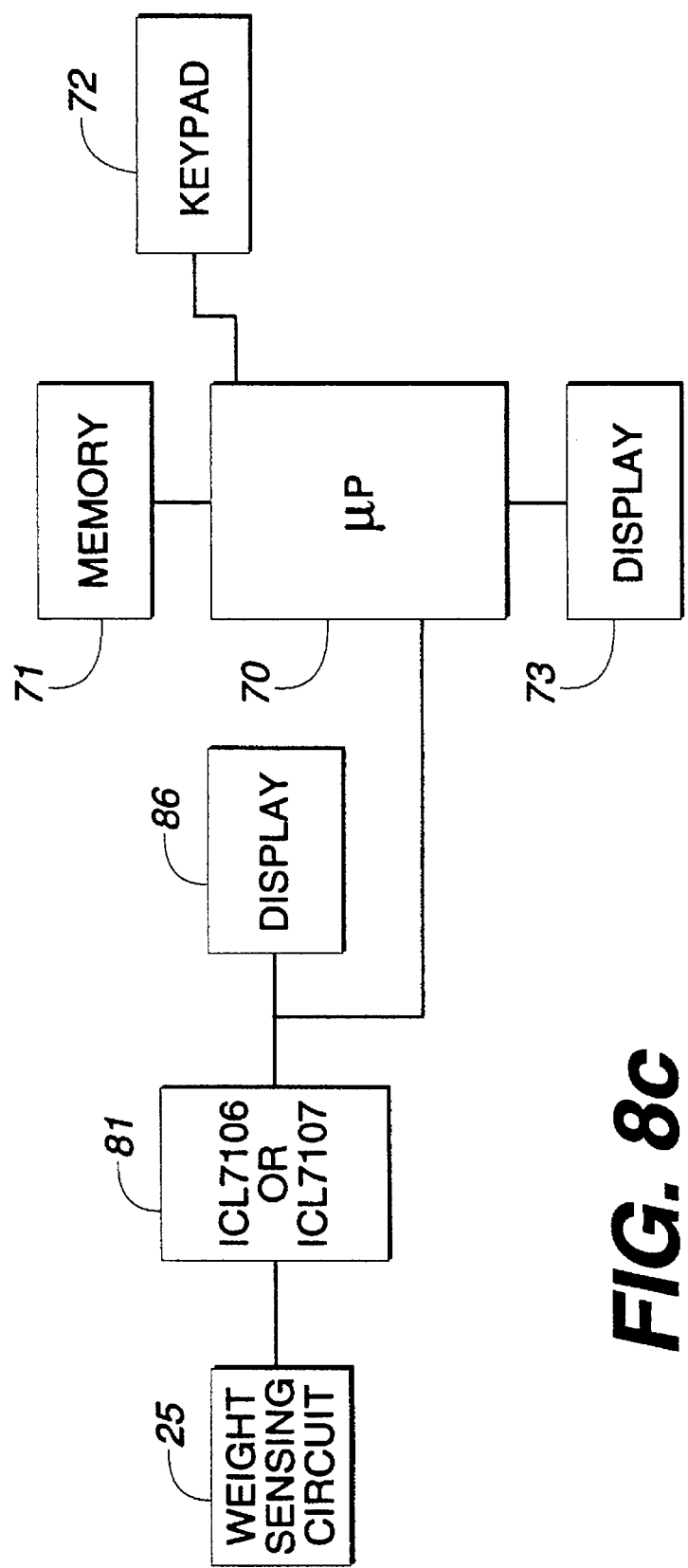
FIG. 8c illustrates a functional block diagram of an alternative embodiment of the circuit components of the electromechanical cake decorating apparatus of the present invention.

The turntable top comprised of the platen 1, flange 3 and shaft 4 preferably is a conventional top currently provided by Bakery Craft, Inc. The top provided by Bakery Craft, Inc. is comprised of a 12" round support surface attached to an $^{11}/_{16}$" diameter shaft. The entire turntable top is a die cast machined aluminum piece. The base will preferably has an on/off switch attached to the outside of it to allow a cake decorator to switch the power provided to the apparatus on or off. The base also has a port formed therein for providing power to the apparatus from an external AC power source. If a DC power source is used, the DC power source can be contained to be base. In this case, a port is formed in the base to allow the DC power source to be recharged by an external recharger. The base also has a window or an opening formed therein to allow the digital display to be viewed by the cake decorator. If the microprocessor 70 and memory device 71 of FIG. 8a–8c are contained in the base, the keypad 72 and display means 73 can be housed in the side of the base to allow personnel to enter information on the keypad 72 and view information displayed on display 73 in response to requests entered on the keypad 72.

It should be apparent to those skilled in the art that it may not be necessary to have two separate displays, i.e., one for displaying the weight of the cake and one for displaying information in response to a request entered on the keypad. It is possible if desired, to have one display which displays the weight information and any information displayed in response to a request entered on the keypad. It is also possible to remove all of the signal processing circuitry and the display from the base such that the base only contains the mechanical components of the apparatus of the present invention and the weight sensing circuitry. In this case, the weight sensing circuit can be connected to a computer located outside of the base which performs all of the signal processing and display functions. A monitor may be connected to the computer so that the weight of a cake being decorated and any other information can be displayed on the monitor. However, it may be desirable to have a separate display for displaying the weight of the cake.

Figure 3:
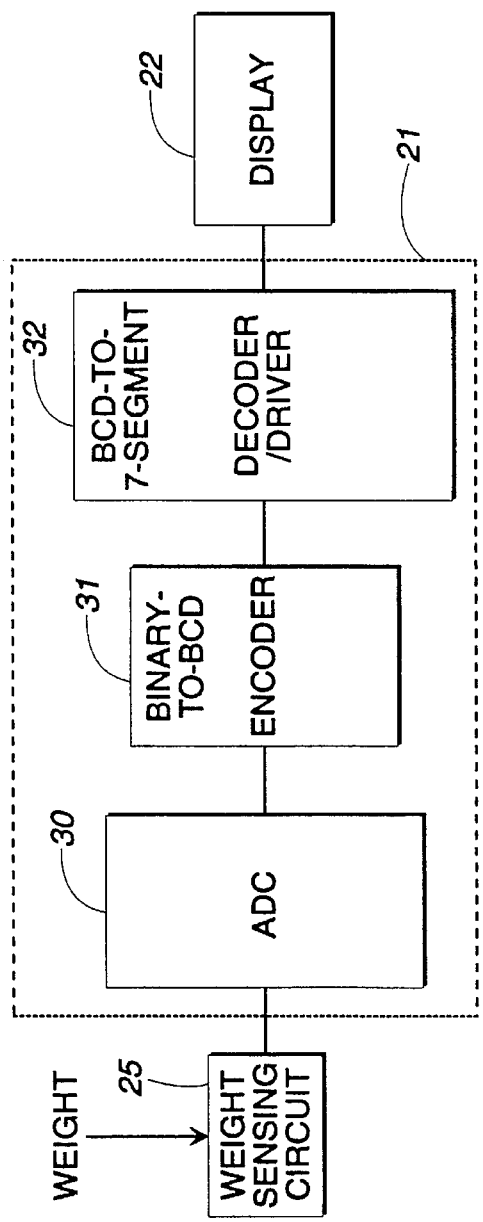
FIG. 3 illustrates a functional block diagram of the circuit components of the electromechanical cake decorating apparatus of the present invention.

FIG. 3 illustrates a functional block diagram of the circuit components of the electromechanical cake decorating apparatus of the present invention in accordance with a first embodiment. As shown in FIG. 3, the apparatus comprises a weight sensing circuit 25, which includes a transducer, for receiving a force equal to the weight of a cake placed on the turntable and for translating the weight into an analog voltage signal which is provided to an analog-to-digital converter 30. The analog-to-digital converter 30 converts the analog voltage signal into a digital voltage signal consisting of a plurality of binary states representative of the digital voltage signal. The binary number generated by the analog-to-digital converter 30 is provided to a binary-to-BCD encoder 31 which encodes the signal in binary coded decimal and which provides the binary coded decimal number to a BCD-to-7-segment decoder/driver 32. The BCD-to-7-segment decoder/driver 32 converts the BCD signal into 7-segment format information and provides the information to a digital display 22. The block comprises the signal processing circuitry of the present invention. The signal processing circuitry 21 can be implemented in a number of ways as discussed in more detail below. The turntable is coupled to the weight sensing circuit 25 for supporting a cake to be decorated and for transmitting the weight of the cake through the turntable shaft to the weight sensing circuit 25.

Figure 4:
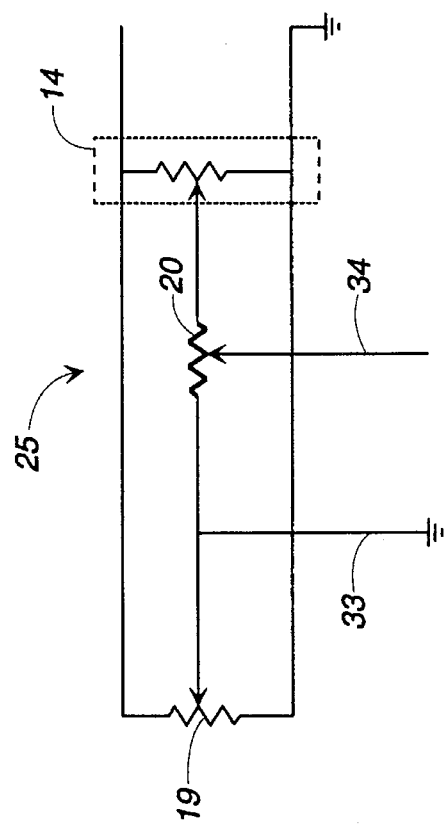
FIG. 4 illustrates a schematic diagram of the weight sensing circuit of the electromechanical cake decorating apparatus in accordance with one embodiment of the present invention.

FIG. 4 illustrates a schematic diagram of the one embodiment of the weight sensing circuit 25 of the present invention. The weight sensing circuit 25 comprises three potentiometers arranged in a balanced bridge. The bridge comprises a rectilinear potentiometer 14 which is mechanically coupled to the turntable (not shown in FIG. 4) for converting the force applied to the turntable into an analog voltage signal. The circuit also includes a zero adjustment potentiometer 19 and a sensitivity adjustment potentiometer 20. The output from the bridge circuit is the differential voltage provided between lines 33 and 34 which will be connected to the signal processing circuitry.

The bridge circuit operates with a 1.25 DC reference voltage. In order to calibrate the weight sensing circuit 25, the bridge circuit must be adjusted after the turntable has been installed so that the differential voltage between lines 33 and 34 is zero volts (i.e., the weight of the turntable is ignored). The zero adjustment potentiometer 19 is used for this purpose. The zero adjustment potentiometer 19 is adjusted after the turntable has been installed so that the differential voltage output from the circuit is 0. The sensitivity adjustment potentiometer 20 is adjusted after calibration and after the bridge circuit 25, the signal processing circuitry 21 and the display 22 have been connected. The sensitivity adjustment potentiometer 20 is adjusted so that the correct relationship is obtained between the force applied to the turntable and the corresponding number displayed on the digital display.

Figure 5:
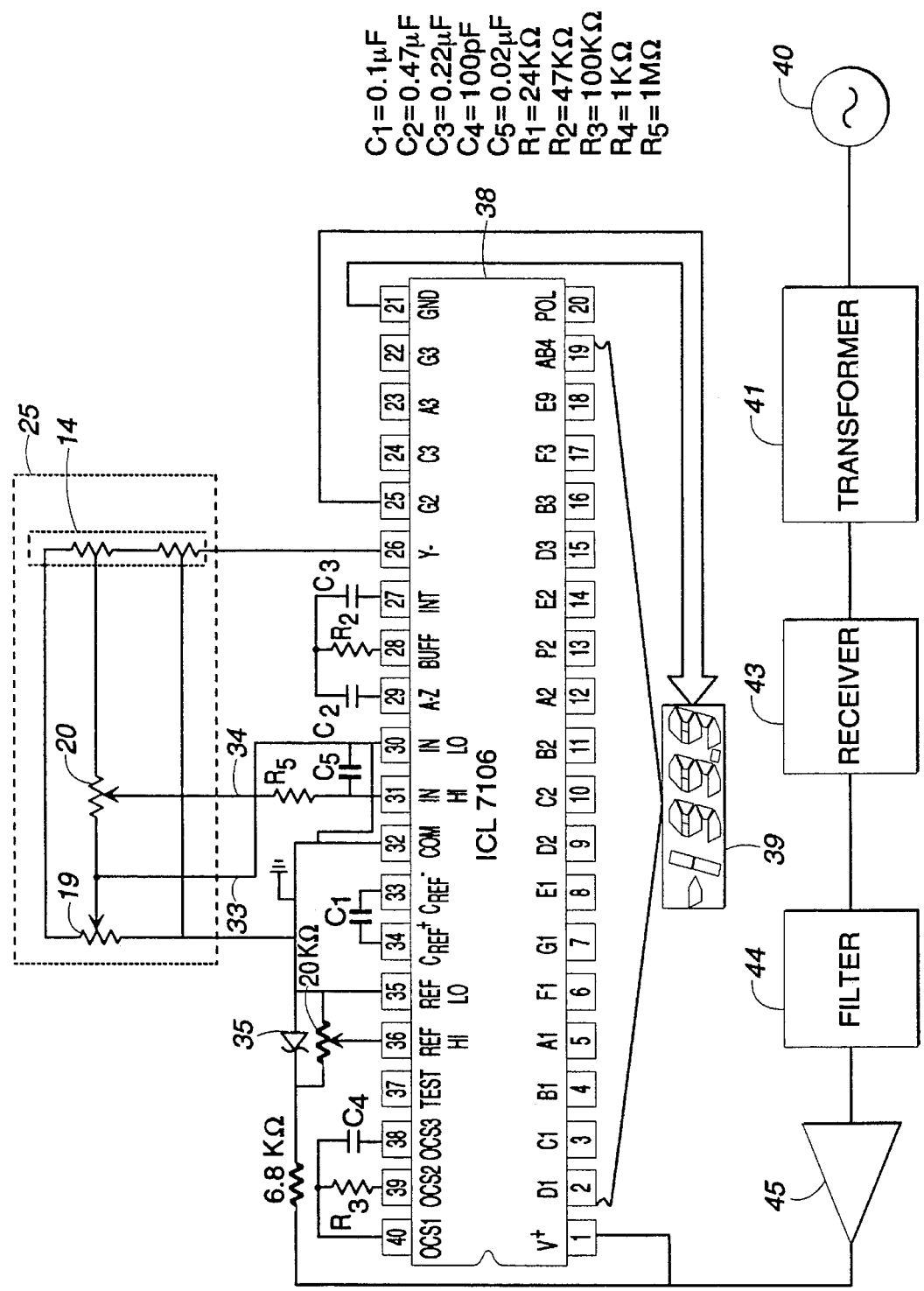
FIG. 5 illustrates a first embodiment of the circuit components of the electromechanical cake decorating apparatus of the present invention.

FIG. 5 illustrates another embodiment of the present invention wherein the signal processing circuitry 21 of the functional block diagram shown in FIG. 3 is accomplished by using a Harris Semiconductor ICL7106 3½ digit LCD display A/D converter. Integrated circuit 38 comprises a 3½ digit analog-to-digital converter, a 7-segment decoder, a display driver, a reference, and a clock. The integrated circuit 38 is designed to interface with a liquid crystal display 39 and includes a multiplexed back plane drive. Any type of LCD/seven segment display available on the market is suitable for use with the integrated circuit 38. The integrated circuit 38 includes an auto-zero feature which causes the integrated circuit 38 to zero the display 39 when power is provided to the integrated circuit 38. Power is preferably provided by an AC power source 40. A step-down transformer 41 steps the AC voltage down and a rectifier 43 rectifies the AC voltage signal to produce a DC voltage signal. A ripple filter 44 takes any ripple out of the rectified wave form and a voltage regulator 45 regulates the voltage so that a 5 volt DC voltage is provided to the integrated circuit 38. Components 41, 43, 4 and 45 are preferably incorporated in an ACOPIAN AC/CD Power Module, Model NO. 5E100. The output lines 33 and 34 from the weight sensing circuit 25 are provided to the IN LO and IN HI pins, respectively, of the integrated circuit 38. The recommended resistive and capacitive values are supplied by the manufacturer and are those values indicated next to the drawing. A Zenor diode 35 clamps the regulated voltage to approximately 1.25 volts which functions as the 1.25 DC reference voltage across the weight sensing circuit 25. The Zenor diode is preferably an ICL8069 manufactured by Harris Semiconductor. The IN LO, REF LO and analog common pins (pins 31, 35 and 32, respectively) are grounded at a common point in order to remove the common mode voltage from the reference system of the integrated circuit 38, which is desirable when an external reference voltage is being used, as is the case in the present embodiment.

The integrated circuit 38 has three phases of operation, namely, the auto-zero phase, the signal integrate phase and the de-integrate phase. During the auto-zero phase, the IN HI and IN LO pins are internally shorted together with the analog common, which eliminates the differential input voltage and results in all zeros being displayed on the LCD 39. During the signal integrate phase, the internal short between IN HI and IN LO is removed the differential voltage between IN HI and IN LO is integrated by charging a reference capacitor connected between pins 33 and 34. During this phase, the polarity of the input signal is determined. During the de-integrate phase, the IN HI is internally connected across the reference capacitor and circuitry within the integrated circuit 38 allows the reference capacitor to discharge to zero. The integrated circuit 38 measures the amount of time for the reference capacitor to discharge to zero. The time required is proportional to the analog input signal which allows the integrated circuit to calculate the corresponding digital voltage signal. The integrated circuit 38 then causes a digital reading to be displayed on LCD 39 which corresponds to the analog voltage signal output from the weight sensing circuit 25.

Although the electromechanical cake decorating apparatus of the present invention preferably operates on an AC power supply, a DC power source can be used instead. If a DC power source is used, preferably eight 1.25 volt rechargeable nickel cadmium batteries will be used in series to achieve a 9 volt DC power source. The preferred LCD 39 to be used with the integrated circuit 38 is a VI5032-DP liquid crystal display. Other LCDs which are suitable for use with the ICL7106 are VI-318, VI-302, VI-303, VI-322, VI-315, VI-323, VI-319, VI-320, VI-401, VI-402 and VI-422. All of the above mentioned LCDs are 3½ digit displays with the exception of the VI-401, VI-402 and VI-422, which are four digit displays.

Figure 6:
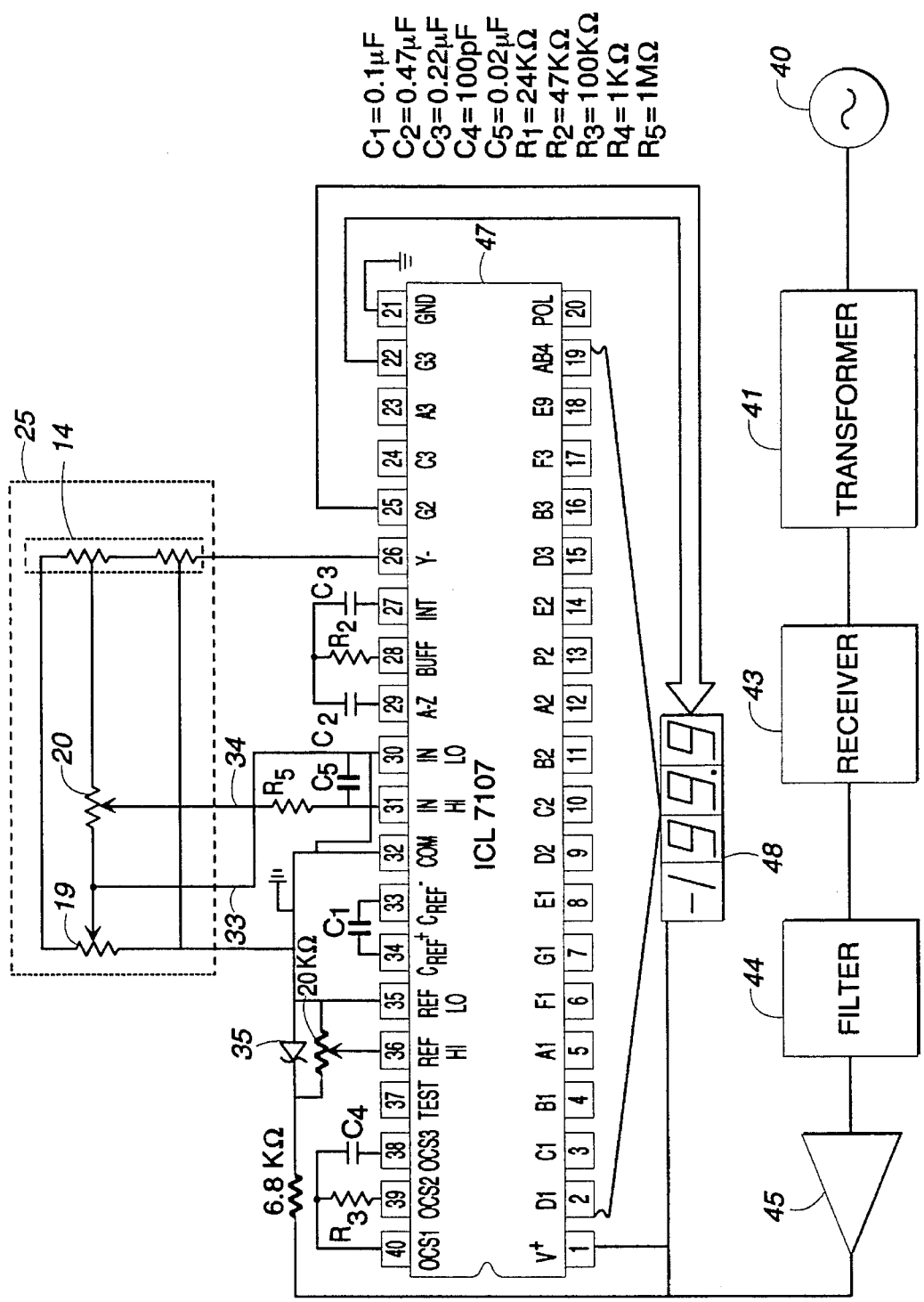
FIG. 6 illustrates a second embodiment of the circuit components of the electromechanical cake decorating apparatus of the present invention.

FIG. 6 illustrates the preferred embodiment of the present invention wherein a Harris Semiconductor ICL7107 3½ digit LED display A/D converter 47 is used to drive an LED display 48. The ICL7107 operates essentially the same way as the ICL7106 of FIG. 5 with the exception that it is designed to drive an LED display 48 rather than a liquid crystal display. The resistive and capacitive values recommended by the manufacturer are the same as those for the ICL7106 and the weight sensing circuit 25 and the pins of the ICL7107 are connected in the same manner as with the ICL7106 of FIG. 5. Any type of LED/seven segment display available on the market is suitable for use with the integrated circuit 47 shown in FIG. 6. It is preferable in this embodiment to use the ICL7107 in combination with an LED display because LED displays are generally much less expensive than LCDs and the contrast provided by an LED display is suitable for the purposes of the present invention. As with the ICL7106 shown in FIG. 5, a DC power source can also be used with the ICL7107 of FIG. 6. The DC power source discussed above with respect to FIG. 5 is suitable for use with the circuit shown in FIG. 6. If a DC power source is used, voltage regulator 45, ripple filter 44, rectifier 43, step down transformer 41 and AC power supply will of course be necessary.

Figure 7:
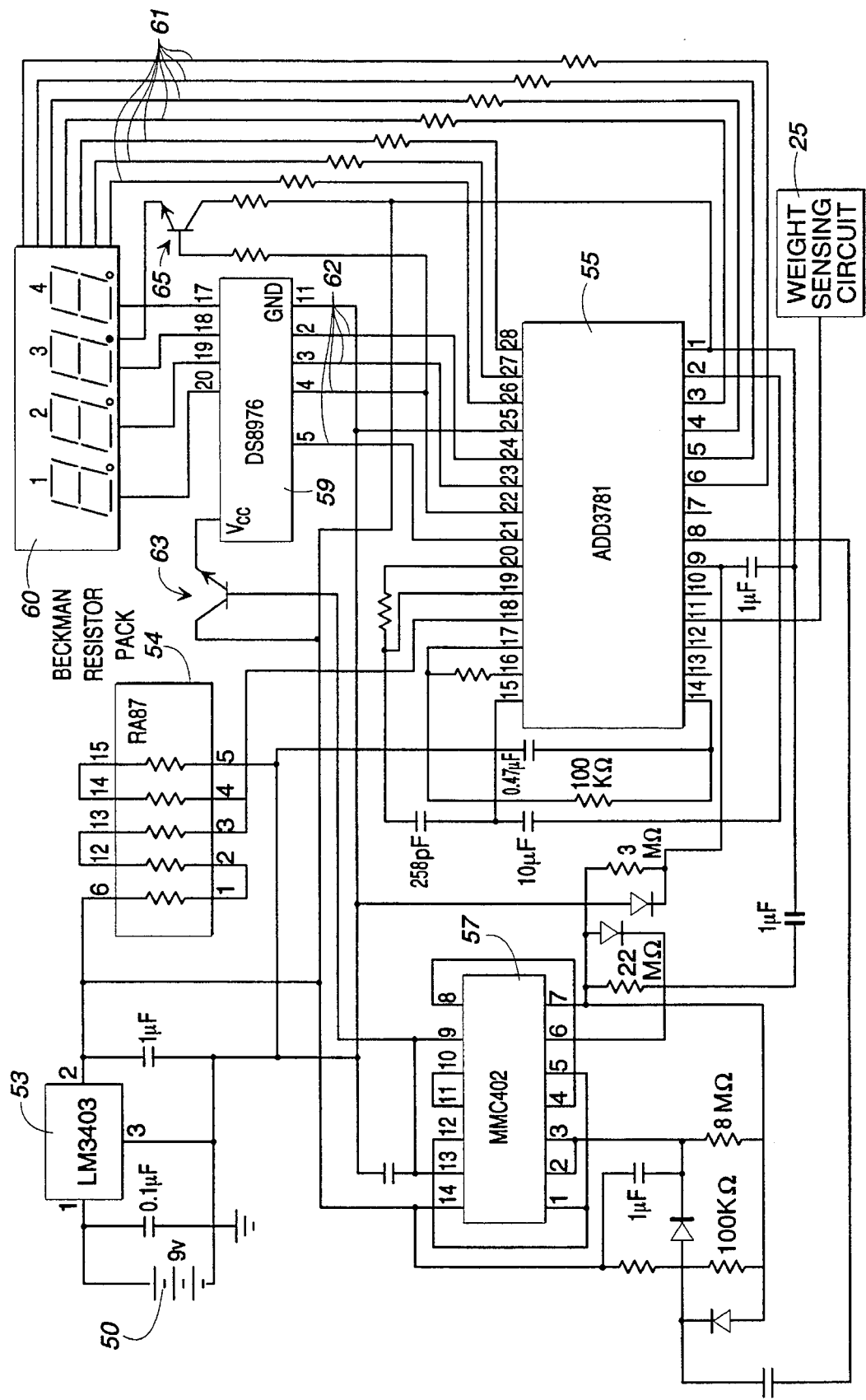
FIG. 7 illustrates a third embodiment of the circuit components of the electromechanical cake decorating apparatus of the present invention.

FIG. 7 illustrates an alternative embodiment of the electromechanical cake decorating apparatus of the present invention wherein a conventional circuit for sensing a weight and for digitally displaying the weight is used in combination with the turntable and weight sensing circuit of the present invention. The circuit shown in FIG. 7 can be found in the Encyclopedia of Electronics Circuits, Vol. 1, page 398, by Rudolph F. Graf. The weight sensing circuit 25 is connected to the turntable (not shown) of the present invention. The weight sensing circuit 25 translates the weight of a cake supported on the turntable into an analog voltage signal which is provided to an ADD 3781 National Semiconductor analog-to-digital converter 55. The analog voltage signal is converted into a digital signal which is further converted into 7-segment format information which is provided to a digital display 60 by bit lines 61. The analog-to-digital converter 55 provides information to display driver 59 by bit lines 62. The display driver 59 drives the digital display 60 and enables one of the four digits in accordance with the information provided to the driver by bit lines 62 so that the 7-segment display format information provided on bit lines 61 is provided to the correct digit of the display 60. A 9 volt DC power source 50 provides power to the circuit. An LM 3403 National Semiconductor voltage regulator 53 clamps the voltage to a preselected digital voltage level which is compatible with the integrated circuits. A resistor pack 54 allows the proper current to be supplied to the selected LED segments of the digital display 60 and provides the appropriate reference voltage for the A/D converter 55. An MM74C02 Motorola NOR Gate has an output pin coupled to the base of transistor 63 to control the voltage supply to the display driver 15.

When the power supply 50 is switched on, the voltage level provided by the voltage regulator 53 is provided to the collectors of transistors 63 and 65, and to the supply voltage and start conversion pins (pins 1 and 9) of A/D converter 55. When this occurs, an output from the NOR gate 57 forward biases transistor 63 thereby allowing the supply voltage to be provided to display driver 55. When the analog-to-digital conversion is complete, the A/D converter 55 causes the NOR gate 57 remove the base current from transistor 63 thereby removing the supply voltage from display driver 59. The decimal point of display 60 connected to the emitter of transistor 65 will be enabled when a high output is generated on bit line D3 of bit lines 62 provided to drive 59, which corresponds to when the third digit of the display will be enabled.

FIGS. 8a–8c illustrate embodiments of the electromechanical cake decorating apparatus of the present invention wherein the apparatus further comprises a microprocessor 70, a memory device 71, a display 73 and a data entry device 72, such as a keypad or a stylus pen and digitizer. Prior to decorating a cake, an employee will enter his or her personal identification number on the keypad 72. the employee then inputs a number on the keypad 72 which corresponds to the type cake to be decorated. Once the cake has been decorated, the employee depresses a key on the keypad 72 which causes the microprocessor 70 to input the binary number provided at the output of the A/D converter 30. The microprocessor 70 causes the employee's personal identification number, the type of cake and the final weight of the cake to be entered into memory 71. An authorized person may later access this information by entering his or her code and a request on the keypad 72. The microprocessor 70 then accesses the requested information from memory 71 and displays the information on display means 73 for the authorized person to view. A printer 80 may be connected to microprocessor 70 for allowing information to be printed, such as when a print request is entered on keypad 72.

The signal processing circuit 21 shown in FIG. 8a can be designed using any components which will accomplish these tasks and which are available on the market today. FIGS. 5, 6 and 7 illustrate only a few embodiments of the signal processing circuit. It will be apparent to those skilled in the art that there are a multitude of components and designs which will accomplish these tasks. It will also be apparent to those skilled in the art that software can be written for controlling the microprocessor 70 to process the information received by the microprocessor 70 in any desired manner. For example, types of requests which may be entered on keypad 72 and processed by the microprocessor 70 and the information which may be displayed on display means 73 is limited only by the type of equipment and circuit design used and the imagination of the software designer.

FIG. 8b illustrates another embodiment wherein the signal processing circuitry 21 is an ICL7106 or an ICL7107. In this embodiment, an A/D converter 85 receives the same information from the weight sensing circuit 25 which is sent to the signal processing circuitry 81. The A/D converter 85 converts the analog voltage signal into a digital number comprised of a plurality of bits. The digital information can be provided serially or in parallel to the microprocessor 70 where it can be processed and/or stored in memory 71, as discussed above with respect to FIG. 8a.

In accordance with the embodiment shown in FIG. 8c, the microprocessor 70 receives the 7-segment display format information being transmitted from signal processing circuitry 81 to display 86. In accordance with this embodiment, the microprocessor 70 is programmed to convert the 7-segment format information into a digital number which corresponds to the weight detected by the weight sensing circuit 25. The microprocessor 70 can process and access information in accordance with instructions entered on keypad 72 in the same manner discussed above with respect to FIGS. 8a and 8b. The embodiment shown in FIG. 8c is essentially the same as the embodiment shown in FIG. 8b with the exception that the embodiment of FIG. 8c does not require the analog-to-digital converter 85 because the microprocessor 70 of FIG. 8c is programmed to process the 7-segment format information to obtain a digital number corresponding to the weight detected by the weight sensing circuit 25.

Most grocery stores have a central inventory computer (not shown) which stores information, such as price and quantity, relating to products purchased and sold by the grocery store. In accordance with the embodiments discussed above with respect to FIGS. 8a–8c, the central inventory computer can be interfaced with the microprocessor 70 so that information relating to the number of each particular type of cake in the bakery/deli can be accessed by the central inventory computer. In this case, it may be necessary to have a translator interposed between the microprocessor 70 and the central inventory computer to allow the information accessed by the central inventory computer through microprocessor 70 to be translated into information which is usable by the central inventory computer.

Figure 9:
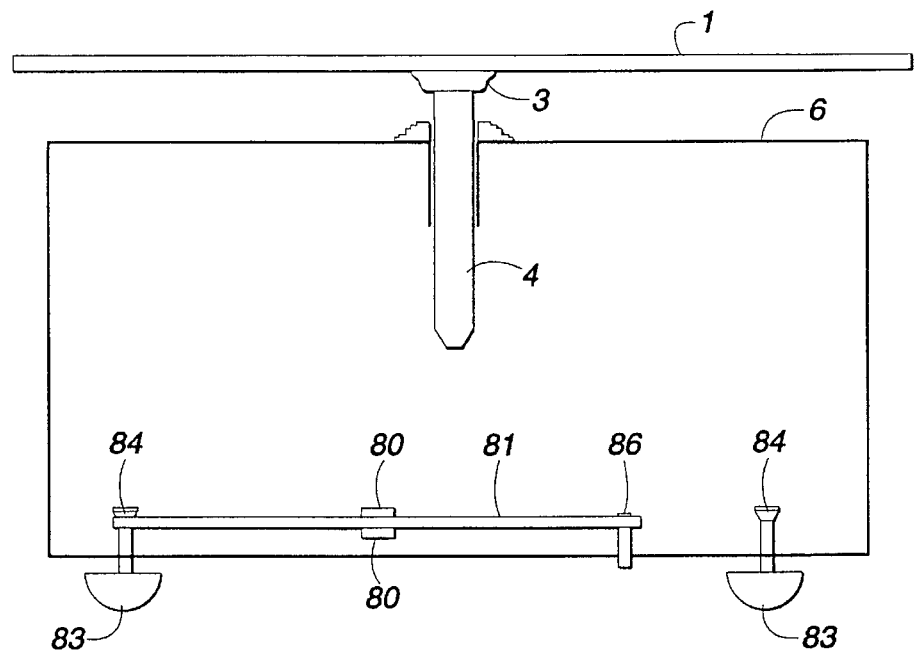
FIG. 9 illustrates the preferred embodiment of the turntable and base of the electromechanical cake decorating apparatus of the present invention.

FIG. 9 illustrates the preferred embodiment of the turntable and base of the electromechanical cake decorating apparatus of the present invention. In accordance with this embodiment, eight strain gauges 80 are laminated onto the surfaces of beams 81, which beams are fixedly connected on one end to the feet 83 which support the base 6 by connectors 84 and which are fixedly secured on the other end to the base 6 by connectors 86. Preferably the beams are made of brass. The connectors may be nuts and bolts or any other mechanical connectors suitable for this purpose. When a cake is placed on platen 1, the flange 3 of the turntable comes into contact with the top surface of base 6 thereby causing a force to be transferred to the bottom of base 6. As the cake is decorated, the decorator also applies force to the cake and that force as well as the weight of the cake and the icing being applied are translated through the base 6 to beams 81 and strain gauges 80. The feet 83 are coupled to the base 6 in such a manner that the base 6 is allowed to move vertically in relation to the feet 83. As the base 6 moves in the vertical directions, the ends of the beams 81 securely connected to the base 6 by connectors 86 will move in relation to the ends of the beams 81 connected by connectors 84 to the feet 83, thereby creating strain in the beams 81 which results in increased or decreased resistance of the strain gauges 80. The strain gauges 80 are electrically connected in series and a constant current is applied to the series arrangement so that the voltage output of the strain gauge circuit will vary as the resistance values of the strain gauges 80 vary. This voltage output is then processed and supplied to a digital display, as described in more detail below with respect to FIGS. 11 and 12.

Figure 10:
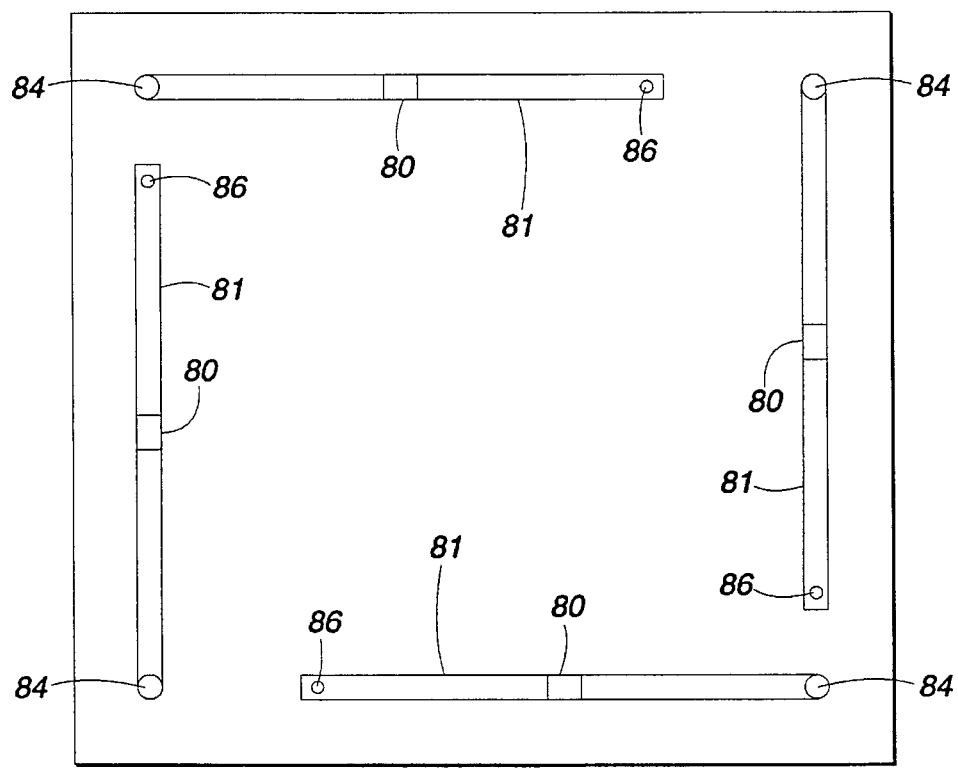
FIG. 10 illustrates a top view of the turntable and base of the electromechanical cake decorating apparatus of the present invention in accordance with the preferred embodiment of FIG. 9.

FIG. 10 illustrates a top view of the base 6 of the cake decorating apparatus shown in FIG. 9. Four beams 81 are fixedly connected by connectors 84 to the feet 83 (not shown). The beams 81 are fixedly secured on the ends opposite the feet 83 to the base 6 by connectors 86. Each of the beams 81 has a pair of strain gauges 80 laminated onto the top and bottom surfaces thereof for sensing the strain in the beams 81 caused by forces being exerted on the turntable which are translated through the base 6 to the strain gauges 80, as discussed above. For each beam, one strain gauge is in compression and one is in tension to provide four balanced legs. The strain gauges are preferably KFG-5-120-C1-11L1MG2R:G1 strain gauges manufactured by Omega Engineering, Inc. By utilizing this arrangement, forces exerted on the turntable at any point on the platen 1 are translated through the base 6 to the strain gauges 80 so that cakes which are placed directly in the center of platen 1, as well as those which are not, can be accurately and precisely weighed.

Figure 11:
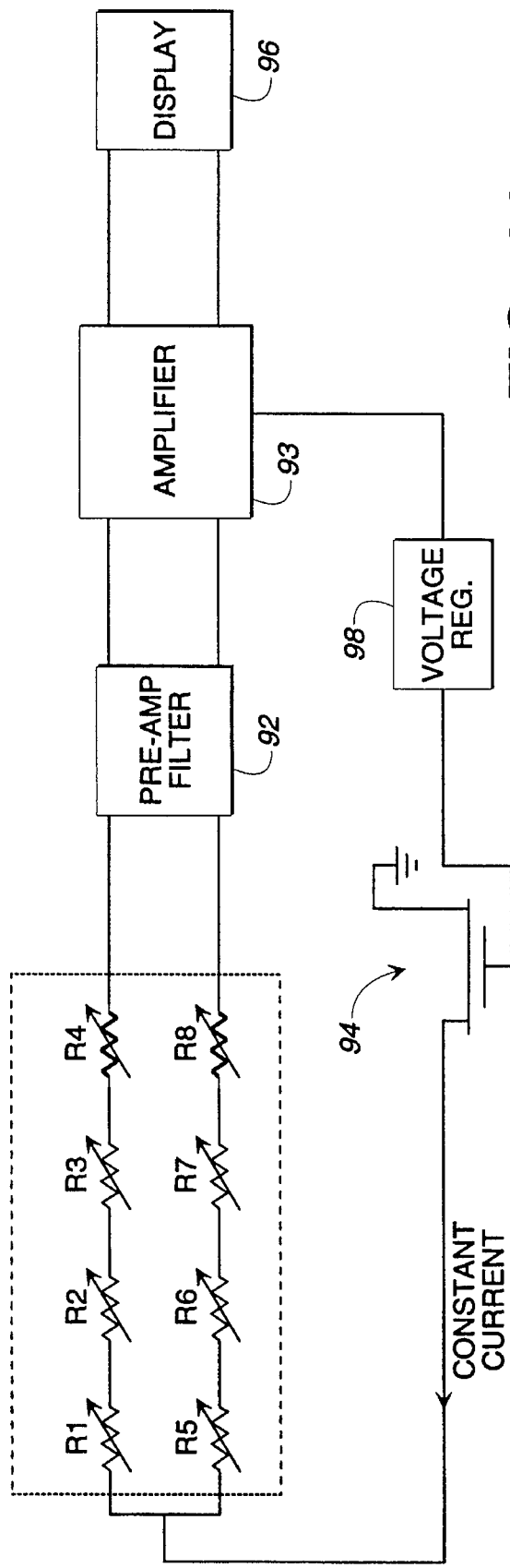
FIG. 11 illustrates a schematic diagram of the electrical circuitry of the electromechanical cake decorating apparatus of the present invention in accordance with the preferred embodiment of FIG. 9.

FIG. 11 illustrates a schematic block diagram of the weight sensing circuitry 90, the signal processing circuitry 92, 93 and 94, and the display means 96 for sensing and displaying the weight of a cake being decorated on the turntable of the cake decorating apparatus shown in FIG. 9. The weight sensing circuit 90 is comprised of eight strain gauges which are represented as variable resistors R1–R8. The output of the weight sensing circuit 90 is applied to a pre-amp filter 92 which filters out unwanted signals and amplifies the signal by a gain of 80. The pre-amp filter 92 is preferably a LM394 super matched BJT pair integrated circuit. The outputs of the pre-amp filter 92 are connected to an amplifier 93 which amplifies the signal by a gain of 20 and provides the amplified signal to a digital display 96. The amplifier 93 is preferably an LMC662AIN dual CMOS operational amplifier integrated circuit which contains two operational amplifiers. One of the operational amplifiers contained in the IC is used to provide a 1.25 volt DC constant current source to weight sensing circuit 90.

Figure 12:
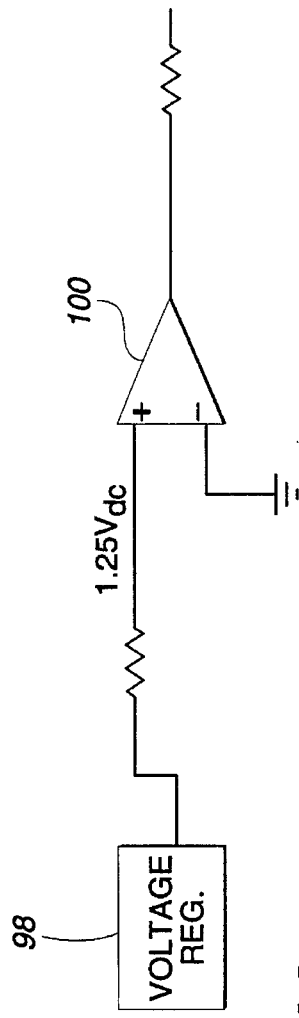
FIG. 12 illustrates a schematic diagram of the circuitry used to generate a constant current for the strain gauges in accordance with the preferred embodiment of FIG. 9.

FIG. 12 illustrates one of the operational amplifiers contained in the LMC662AIN. A 1.25 volt DC signal from a voltage regulator 98 is applied to the non-inverting terminal of op-amp 100 which is a voltage follower having unity gain. The output of op-amp 100 is applied to the gate of MOSFET 94 shown in FIG. 11. The drain of MOSFET 94 is connected to the weight sensing circuit 90 and the source is connected to ground. MOSFET 94 is preferably a BS170. The display 96 is preferably a Digitec model 2010 digital panel meter. The model 2010 digital panel meter comprises the ICL7107 discussed above with respect to FIG. 6 so that all of the processing of the output signals from amplifier 93 is accomplished within the digital panel meter.

It will be apparent to those skilled in the art that any pre-amp filter 92 and any amplifier 93 can be used to filter and amplify the signal from the weight sensing circuit 90 before providing it to the display 96. Furthermore, the weight sensing circuit 90 can also be used, with some modifications, in the circuits shown in FIGS. 3 and 5–8c. Also, it will be apparent to those of ordinary skill in the art that the design of the beams and strain gauges shown in FIGS. 9 and 10 can be changed or modified without departing from the spirit and scope of the present invention. For example, more beams 81 or strain gauges 80 can be used or the beams and strain gauges can be reconfigured to achieve a different design.

It will be apparent to those skilled in the art that the present invention is not limited to an apparatus for measuring and displaying the weight of a cake being prepared and decorated. The apparatus of the present invention can also be used for supporting and weighing other types of food products while they are being prepared and for displaying the weight of the food products during preparation. For example, the apparatus of the present invention can be used for preparing a pizza so that the weight of the ingredients or toppings being placed on the pizza can be ascertained and displayed while the pizza is being prepared. The apparatus of the present invention is suitable for preparing any type of food product for which it is desirable to display the weight of the food product while it is being prepared. Therefore, although the present invention has been described in detail with respect to preparing cakes, the apparatus of the present invention is not limited to preparing cakes. In fact, the type of food product used with the apparatus of the present invention is irrelevant and the present invention has only been described with reference to cake because there is a particular need in the industry for an apparatus which can be used for preparing cakes and which displays the weight of the cake while it is being prepared so that the cake is not over prepared, e.g., over decorated.

It will be apparent to those skilled in the art that the scope of the present invention is not limited to the alternative and preferred embodiments discussed above. There may be many additional ways to accomplish the objectives of the present invention which are within the scope and spirit of the present invention.

What is claimed is:

1. An apparatus for supporting a food product being prepared and for measuring and displaying the weight of the food product being prepared, said apparatus comprising:

a turntable comprising a platen and a shaft, said platen for supporting the food product to be prepared, said shaft having a first end and a second end, said first end of said shaft being connected to said platen;

a base having an opening formed therein for receiving said shaft and for substantially preventing lateral movement of said turntable with respect to said base;

a weight sensor contained within said base, at least a portion of said weight sensor being in contact with said base for sensing the weight of a food product supported on said platen and for producing a voltage signal proportional to the weight of the food product supported on said platen wherein said weight sensor comprises a plurality of beams, each of said beams having a first end and a second end, wherein at least one transducer is attached to each of said beams at a location between the first and second ends of said beams for sensing strain in said beams and wherein each of said beams is attached to said base at a point at or near the second end of each beam and wherein of each beam is attached at or near the first end of each beam to a means for supporting said base to allow vertical movement of said base with respect to the first ends of said beams;

signal processing means connected to said weight sensor for receiving the voltage signal produced by said weight sensor and for processing the signal into display information for display;

display means connected to said signal processing means for receiving the display information from said signal processing means and for displaying a digital number which corresponds to the weight of the food product supported on said platen.

2. An apparatus according to claim 1, wherein each of said beams has a top and a bottom surface and a strain gauge laminated to the top and bottom surfaces of each of said beams.

3. An apparatus according to claim 2 wherein said base has a top and a bottom surface and four vertical walls connecting the top surface to the bottom surface and wherein each of said beams is securedly fastened to the bottom surface of said base at a location on said beam near the second end thereof and wherein each of said beams is disposed adjacent one of said vertical walls of said base and runs parallel thereto.

4. An apparatus according to claim 1, wherein said signal processing means comprises a pre-amp filter connected to said weight sensor for receiving the voltage signal and for filtering out the unwanted signals and amplifying the voltage signal, and an amplifier connected to said pre-amp filter for receiving the amplified voltage signal from the pre-amp filter and for further amplifying the voltage signal prior to providing the voltage signal to the display means.

* * * * *